(12) United States Patent
Hedtke

(10) Patent No.: US 7,379,792 B2
(45) Date of Patent: May 27, 2008

(54) PRESSURE TRANSMITTER WITH ACOUSTIC PRESSURE SENSOR

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/238,654

(22) Filed: Sep. 29, 2005

(65) Prior Publication Data

US 2007/0073417 A1 Mar. 29, 2007

(51) Int. Cl.
G05D 16/00 (2006.01)
G01L 7/08 (2006.01)
G01L 15/00 (2006.01)
G01L 13/02 (2006.01)

(52) U.S. Cl. .................... 700/301; 73/715; 73/716
(58) Field of Classification Search ............. 700/301; 73/1.16, 715–716, 736, 861.01, 861.18, 861.23, 73/861.42, 861.47, 861.52, 861.63, 722–723, 73/728, 1.35, 1.57
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,120,206 A | 10/1978 | Rud, Jr. | 73/718 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,244,226 A * | 1/1981 | Green et al. | 73/703 |
| 4,287,553 A | 9/1981 | Braunlich | 361/283 |
| 4,322,775 A | 3/1982 | Delatorre | 361/283 |

(Continued)

FOREIGN PATENT DOCUMENTS

DE 43 33 753 5/1994

(Continued)

OTHER PUBLICATIONS

Notification of Transmittal of the International Search Report and the Written Opinion of the International Searching Authority, or the Declaration of PCT/US2006/020254.

(Continued)

*Primary Examiner*—Ronald Hartman, Jr.
(74) *Attorney, Agent, or Firm*—Westman, Champlin & Kelly, P.A.

(57) ABSTRACT

A transmitter configured to measure a process variable of an industrial process, includes a pressure sensor configured to couple to a pressure of a fluid. An acoustic detector receives an acoustic signal from the fluid. Measurement circuitry coupled to the pressure sensor and the acoustic detector provides an output related to pressure of the fluid.

21 Claims, 4 Drawing Sheets

U.S. PATENT DOCUMENTS

| | | | |
|---|---|---|---|
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A * | 8/1984 | Frick | 73/756 |
| 4,490,773 A | 12/1984 | Moffatt | 361/283 |
| 4,531,415 A | 7/1985 | Orlowski et al. | 73/718 |
| 4,542,436 A | 9/1985 | Carusillo | 361/283 |
| 4,558,184 A | 12/1985 | Busch-Vishniac et al. | 381/174 |
| 4,562,742 A | 1/1986 | Bell | 73/718 |
| 4,578,735 A | 3/1986 | Knecht et al. | 361/283 |
| 4,586,108 A | 4/1986 | Frick | 73/718 |
| 4,670,733 A | 6/1987 | Bell | 338/36 |
| 4,785,669 A | 11/1988 | Benson et al. | 73/718 |
| 4,829,826 A | 5/1989 | Valentin et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 5,094,109 A | 3/1992 | Dean et al. | 73/718 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,329,818 A | 7/1994 | Frick et al. | 73/708 |
| 5,415,048 A | 5/1995 | Diatschenko et al. | 73/861.04 |
| 5,469,749 A * | 11/1995 | Shimada et al. | 73/861.47 |
| 5,492,016 A | 2/1996 | Pinto et al. | 73/724 |
| 5,524,492 A | 6/1996 | Frick et al. | 73/706 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,705,978 A | 1/1998 | Frick et al. | 340/511 |
| 5,757,608 A | 5/1998 | Bernot et al. | 361/283.4 |
| 5,760,310 A * | 6/1998 | Rud et al. | 73/706 |
| 5,911,162 A | 6/1999 | Denner | 73/718 |
| 5,920,016 A | 7/1999 | Broden | 73/756 |
| 5,969,258 A | 10/1999 | Gerst et al. | 73/718 |
| 5,992,240 A | 11/1999 | Tsuruoka et al. | 73/718 |
| 6,295,875 B1 * | 10/2001 | Frick et al. | 73/718 |
| 6,301,973 B1 | 10/2001 | Smith | 73/861.357 |
| 6,484,585 B1 * | 11/2002 | Sittler et al. | 73/718 |
| 6,520,020 B1 * | 2/2003 | Lutz et al. | 73/706 |
| 6,564,643 B1 | 5/2003 | Horie et al. | 73/724 |
| 6,647,794 B1 | 11/2003 | Nelson et al. | 73/718 |
| 6,654,697 B1 * | 11/2003 | Eryurek et al. | 702/47 |
| 6,662,662 B1 | 12/2003 | Nord et al. | 73/715 |
| 6,675,655 B2 | 1/2004 | Broden et al. | 73/716 |
| 6,701,274 B1 * | 3/2004 | Eryurek et al. | 702/140 |
| 6,828,801 B1 | 12/2004 | Burdick et al. | 324/658 |
| 6,892,582 B1 | 5/2005 | Satou et al. | 73/715 |
| 6,945,115 B1 | 9/2005 | Wang | 73/718 |
| 6,992,492 B2 | 1/2006 | Burdick et al. | 324/658 |
| 2002/0178827 A1 * | 12/2002 | Wang | 73/718 |
| 2004/0015069 A1 * | 1/2004 | Brown | 600/407 |
| 2004/0168523 A1 * | 9/2004 | Fernald et al. | 73/861.01 |
| 2005/0005712 A1 * | 1/2005 | Gysling et al. | 73/861.23 |
| 2005/0011278 A1 * | 1/2005 | Brown et al. | 73/861.18 |
| 2005/0132808 A1 * | 6/2005 | Brown et al. | 73/592 |
| 2006/0206288 A1 * | 9/2006 | Brahmajosyula et al. | 702/183 |
| 2006/0278005 A1 * | 12/2006 | Broden et al. | 73/716 |
| 2006/0278007 A1 * | 12/2006 | Harasyn et al. | 73/723 |

FOREIGN PATENT DOCUMENTS

| | | |
|---|---|---|
| EP | 0291393 | 11/1988 |
| WO | WO 93/04343 | 3/1993 |
| WO | WO 99/53286 | 10/1999 |
| WO | WO 01/59418 | 8/2001 |

OTHER PUBLICATIONS

"Notification of Transmittal of the International Search Report and The Written Opinion of the International Searching Authority, or the Declaration", PCT/US2006/036404, filed Sep. 19, 2006; 2 pages.

"International Search Report", PCT/US2006, 036404, filed Sep. 19, 2006; 3 pages.

"Written Opinion of the International Searching Authority", PCT/US2006/036404, filed Sep. 19, 2006; 6 pages.

"Notification of Transmittal of the International Search Report and the Written Opinion of the International Searching Authority, or the Declaration" ; PCT/US2-6/046742; filed Jul. 12, 2006; 11 pages.

Donald E. Harasyn and Charles R. Willcox, "Line Pressure Measurement Using Differential Pressure Sensor", U.S. Appl. No. 11/140,681, filed May 27, 2005; 31 pages.

* cited by examiner

PRESSURE TRANSMITTER WITH ACOUSTIC PRESSURE SENSOR

BACKGROUND OF THE INVENTION

The present invention relates to transmitters of the type used to sense process variables in industrial processes. In particular, the present invention relates to pressure transmitters which are configured to measure a pressure of such a process.

Transmitters are used in process monitoring and control systems to measure various process variables of industrial processes. One type of transmitter measures pressure of a process fluid in the process. The pressure can be used directly, or used to determine other process variables such as flow rate. One technique used to measure flow is based upon a differential pressure created in the process fluid. There is a known relationship between the differential pressure and flow rate. However, the relationship is not dependent only upon the differential pressure. Additional process variables may be measured to more accurately determine flow rate including absolute or line pressure along with temperature. One technique used to measure line pressure is to have a separate line pressure sensor. Another technique is described in co-pending application Ser. No. 11/140,681, commonly assigned with the present application.

In addition to having an alternative means for measuring line pressure as discussed above, there are other situations in which it is desirable to measure line pressure. These include a secondary line pressure measurement for use in diagnostics of a primary sensor, for a direct line pressure measurement sensor, or for use in determining other process variables.

SUMMARY

A transmitter is configured to measure a process variable of an industrial process, and includes a pressure sensor configured to couple to a pressure of a fluid and provide an output related to process pressure. An acoustic detector is configured to receive an acoustic signal from the fluid. Measurement circuitry coupled to the pressure sensor and the acoustic detector having an output related to pressure of the fluid.

In another configuration, a transmitter is provided which includes a line pressure sensor which measures line pressure based upon an acoustic signal or determines temperature of a process fluid using an acoustic signal under known pressure conditions.

DETAILED DESCRIPTION

As discussed in the Background section, pressure sensors are used in various industrial process and monitoring applications by pressure based transmitters. A number of different technologies are used to measure pressure. For example, a pressure applied to a deflectable diaphragm can be measured based upon a change in an electrical capacitance measured between the diaphragm and an electrode. Other measurement technologies use, for example, measurement of stress, or other characteristics of a component, which change in response to an applied pressure.

The present invention provides a pressure sensor in which an applied pressure is measured based upon changes in an acoustic signal which travels through a fluid under pressure. An acoustic input or source is coupled to the fluid to transmit the acoustic signal. An acoustic detector or receiver receives the signal. Based upon the received signal, measurement circuitry can be configured to provide an output related to the pressure of the fluid.

Figure 1:
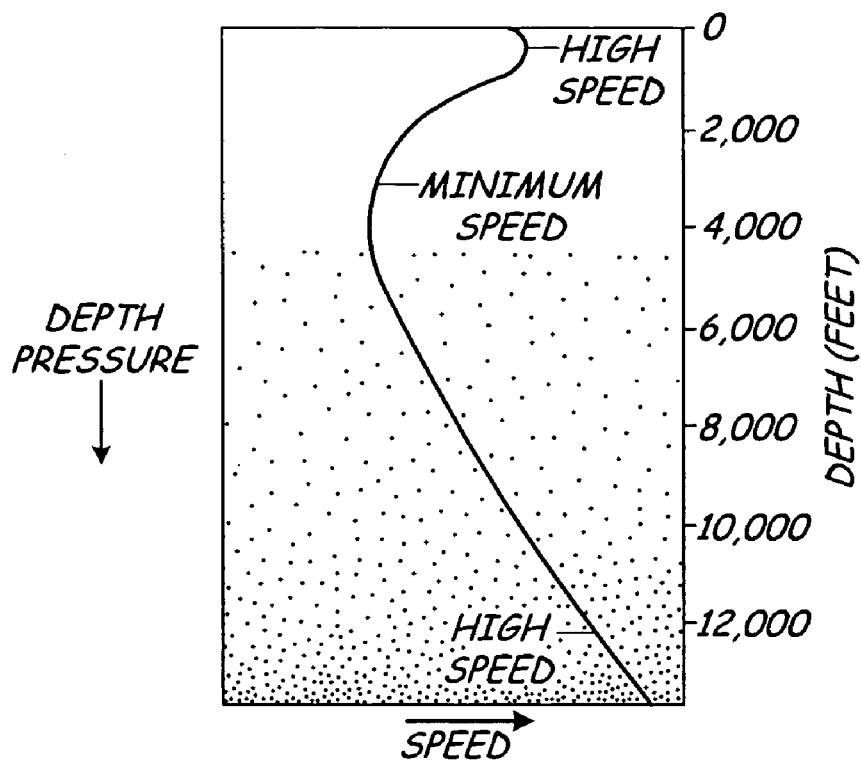
FIG. 1 is a graph of depth versus speed of an acoustic signal.

The present invention makes use of the known relationship between the speed of an acoustic signal through fluid and the temperature and pressure of the fluid. For example, it is known that the speed of sound in ocean water depends upon the temperature, salinity and pressure of the water. FIG. 1 is a graph of depth versus speed in such a medium. In the graph of FIG. 1, the speed of the acoustic signal initially decreases with increasing depth. This is due to the decrease in the temperature of the water. However, as the water temperature becomes constant at greater depths, the speed begins to increase with increasing depth (pressure). In water, the speed of sound ranges from between about 1400 to 1570 m/sec (4593 to 5151 ft/sec) This is about 1.5 km/sec (just under 1 mile/sec) or about 4 times faster than sound travels through air.

Further, in a dispersive medium such as water, sound speed is a function of frequency. This means that the propagating acoustic disturbances will continually change because each frequency component propagates at its own phase speed, while the energy of the disturbance propagates at the group velocity. On the other hand, air is a non-dispersive medium and sound speed is independent of frequency. Therefore, in air, the speed of energy transport and sound propagation are the same.

Figure 2:
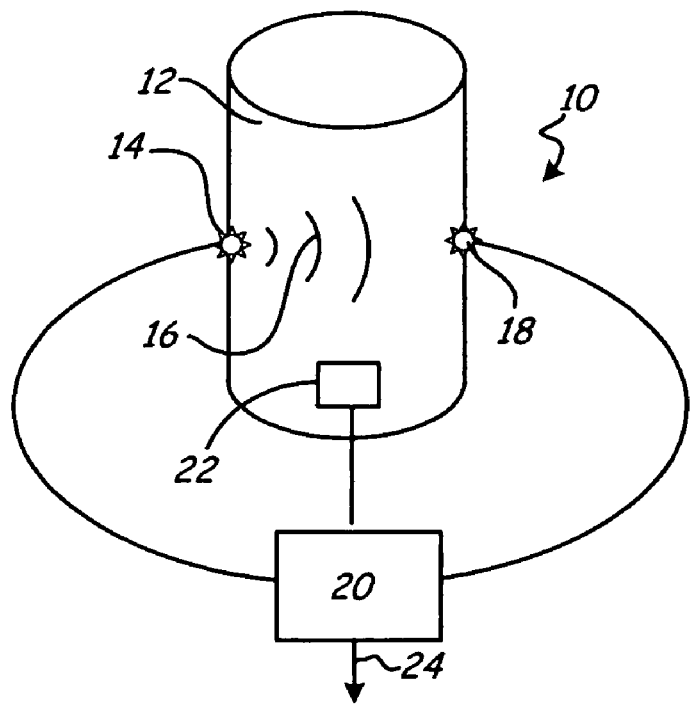
FIG. 2 is a simplified diagram of a measurement circuitry coupled to a pressure containing structure in accordance with the invention.

FIG. 2 is a simplified diagram of a pressure sensor 10 in accordance with one embodiment. Pressure sensor 10 comprises a pressure containing structure 12 which contains a fluid at the pressure of the process fluid. This may be the process fluid itself or an isolation fluid which is subjected to the same pressure from the process fluid. An acoustic input or source 14 is coupled to the pressure containing structure 12 and configured to transmit an acoustic signal 16 through the fluid in the pressure containing structure 12. An acoustic detector or receiver 18 receives the acoustic signal 16 and responsively provides an output. The acoustic input 14 and acoustic detector 18 are coupled to measurement circuitry 20. Measurement circuitry 20 determines the pressure of the fluid in the pressure containing structure based upon a known relationship between the pressure of the fluid and the changes in the acoustic signal 16. An optional temperature sensor 22 is also shown which provides a temperature signal to measurement circuitry 20. This temperature signal can be used by measurement circuitry 20 to compensate the pressure related output 24 based upon the temperature of the fluid and the pressure containing structure 12.

In a related example configuration, the relationship between temperature, pressure and acoustic signature discussed above is used by the apparatus shown in FIG. 2 to determine temperature of the fluid in pressure containing structure 12. In such a configuration, the output from the acoustic detector 18 is related to the temperature of the fluid in the structure 12. If the pressure of the fluid in structure 12 is relatively constant, measurement circuitry 20 can provide an output 24 related to temperature of the fluid. In another example configuration, sensor 22 can comprise a pressure sensor, rather than a temperature sensor. In this configuration, measurement circuitry 20 compensates the temperature output based upon the pressure sensed using pressure sensor 22.

The apparatus and techniques discussed above with reference to FIGS. 1 and 2 can be useful in a number of applications in industrial monitoring and process control systems. For example, in pressure transmitters which measure both differential pressure and line pressure, typically two separate pressure sensors are required. One pressure sensor is configured to measure a differential pressure while a second pressure sensor is used to measure a line pressure. While this does provide accurate measurement, it is expensive and requires additional components. Additionally, performance can also be reduced because there can be a mismatch between the isolation fill fluid used to isolate the pressure sensors from the process fluid. This mismatch may arise between the two sides of differential pressure sensor which are coupled to the process fluid. In the configuration of FIG. 2, line pressure can be measured using the same sensor used to measure differential pressure. Specifically, in such a configuration, pressure containing structure 12 comprises a differential pressure sensor apparatus. The acoustic input 14 and detector 18 are coupled to fluid in the system which is at the pressure of the process fluid. For example, this fluid can be the isolation fluid which extends between isolation diaphragms of the pressure transmitter and a center diaphragm of the pressure sensor. Input 14 and detector 18 couple to the piping which carries the isolation fluid, or can be mounted directly onto the pressure sensor itself.

In another example configuration, the pressure containing structure 12 is part of a line or gauge pressure sensor device. In such a configuration, the acoustic signal 16 can be used to diagnose operation of the line pressure sensor. For example, the readings from the line pressure sensor can be compared with expected readings of the acoustic signal 16. If the acoustic signal 16 is not the same as the expected signal, a warning can be provided indicating that the device is not operating as expected and may be malfunctioning. This can be configured to provide such an indication before an actual failure occurs, i.e., to allow for preventive maintenance. In a related configuration, the acoustic signal is used with the measured line pressure to provide an estimation of temperature of the fluid.

Figure 3:
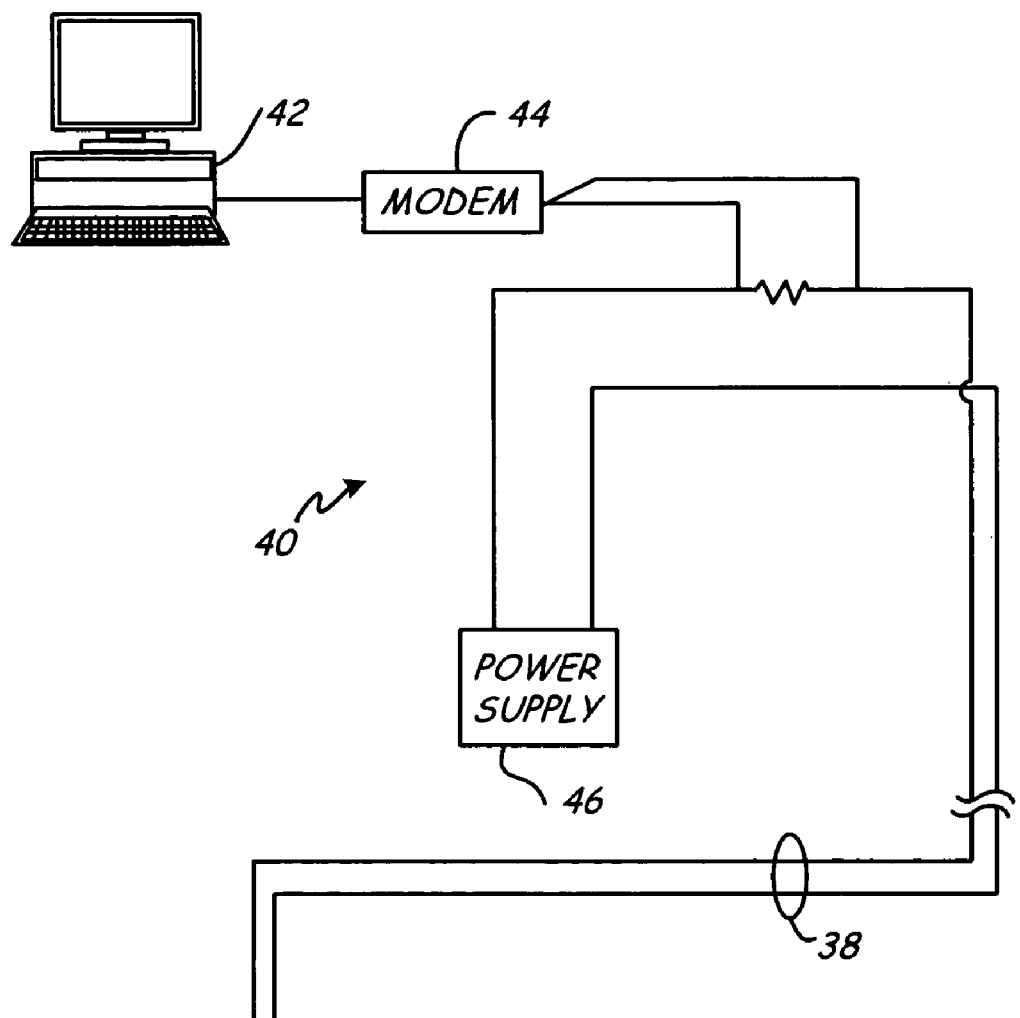
FIG. 3 is a diagram showing an environment of a pressure transmitter.
Figure 3:
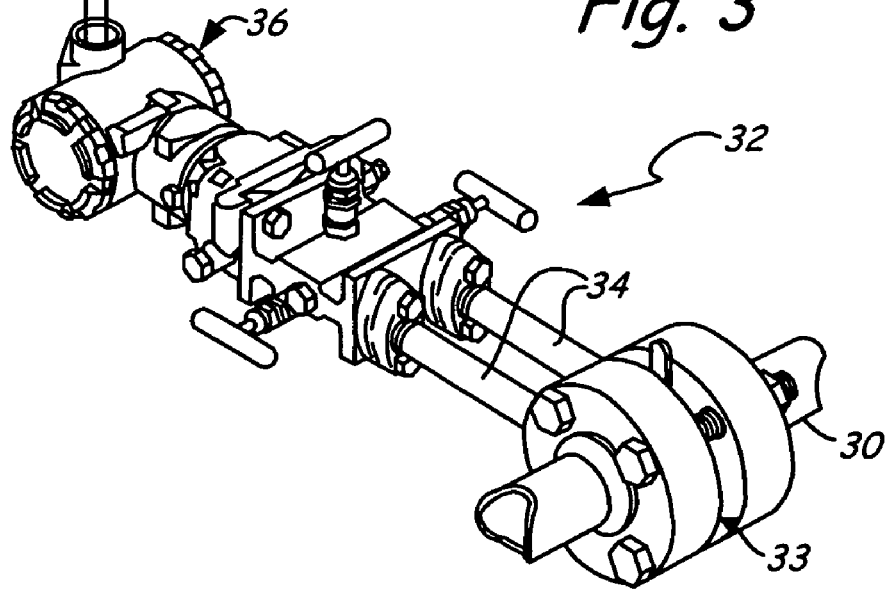

FIG. 3 shows generally the environment of a process measurement system 32 including a process pressure transmitter 36 configured to implement the present invention. FIG. 3 shows process piping 30 containing a fluid under pressure coupled to the process measurement system 32 for measuring a process pressure. The process measurement system 32 includes impulse piping 34 connected to the piping 30. The impulse piping 34 is connected to the process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes the primary element 33.

Transmitter 36 is a process measurement device that receives process pressures through the impulse piping 34. The transmitter 36 senses a differential process pressure and converts it to a standardized transmission signal that is a function of the process pressure.

A process loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 typically powers the transmitter 36.

Figure 4:
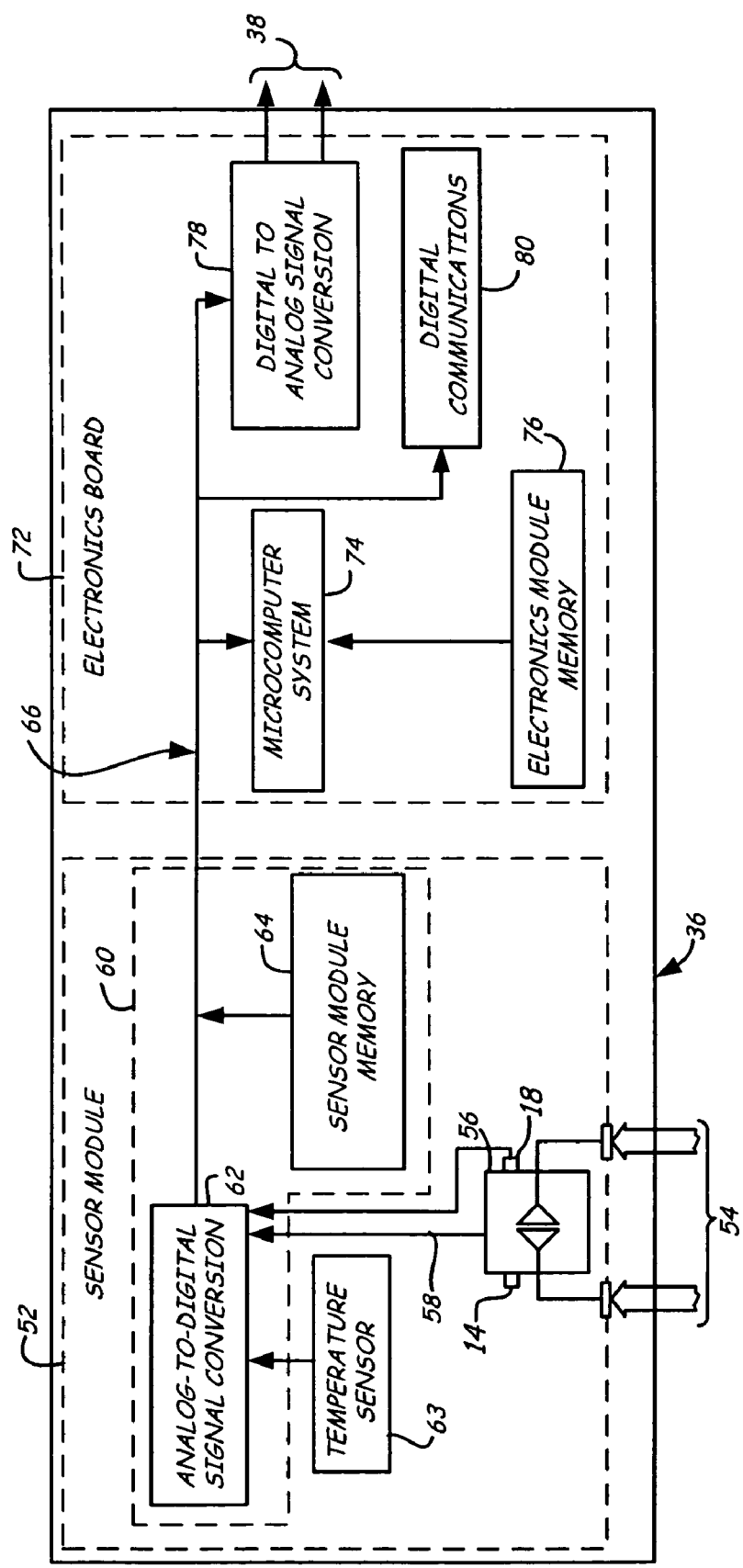
FIG. 4 is a simplified block diagram showing components of the pressure transmitter of FIG. 3.

FIG. 4 is a simplified block diagram of the illustrative pressure transmitter 36. In this example, pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80. Digital to analog signal conversion circuitry 78 can provide any type of output related to sensor pressure including, for example, a flow rate of process fluid which is determined based upon a differential pressure. Other types of outputs include indicative of process pressures, diagnostic outputs, temperature outputs, or others.

In accordance with techniques set forth in U.S. Pat. No. 6,295,875 to Frick et al., pressure transmitter 36 senses differential pressure. However, the present invention is not limited to such a configuration.

FIG. 4 also illustrates acoustic source 14 coupled to source 14 and acoustic sensor 18 coupled to pressure sensor 56. The acoustic signal 16 from source 14 travels through pressurized fluid in sensor 56 and is received by sensor 18. The output of sensor 18 is provided to analog digital converter 62. Microcomputer system 74 receives the digitized signal from sensor 18 and determines line pressure using the techniques discussed above.

Figure 5:
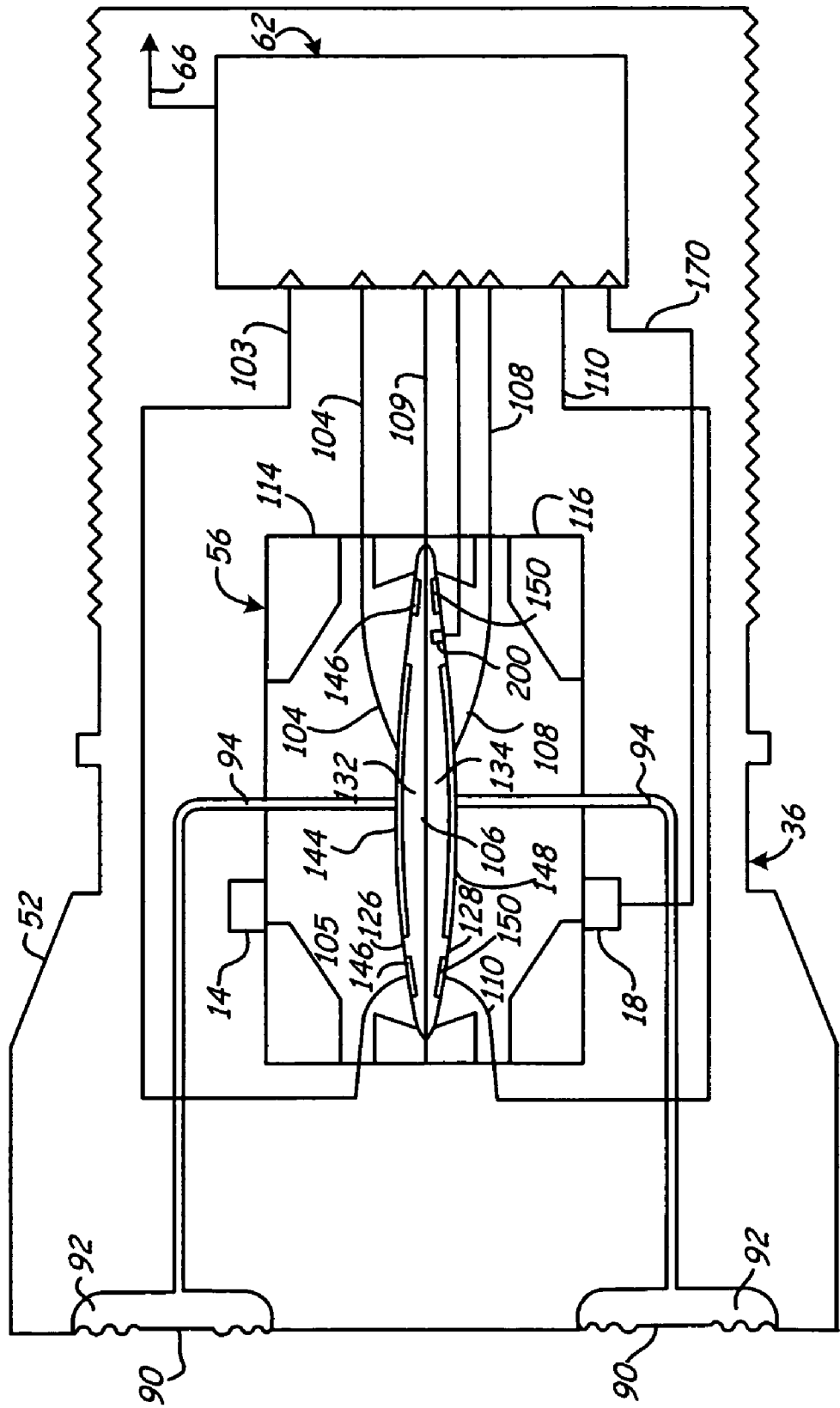
FIG. 5 is a cross-sectional view of the pressure transmitter of FIG. 3 showing a pressure sensor.

FIG. 5 is a simplified cross-sectional view of one embodiment of a sensor module 52 showing pressure sensor 56. Pressure sensor 56 couples to a process fluid through isolation diaphragms 90 which isolate the process fluid from cavities 92. Cavities 92 couple to the pressure sensor module 56 through impulse piping 94. A substantially incompressible fill fluid fills cavities 92 and impulse piping 94. When a pressure from the process fluid is applied to diaphragms 90, it is transferred to the pressure sensor 56.

Pressure sensor 56 is formed from two pressure sensor halves 114 and 116 and filled with a preferably brittle, substantially incompressible material 105. A diaphragm 106 is suspended within a cavity 132,134 formed within the sensor 56. An outer wall of the cavity 132, 134 carries electrodes 146,144,148 and 150. These can, generally, be referred to as primary electrodes 144 and 148, and secondary or secondary electrodes 146 and 150. These electrodes form capacitors with respect to the moveable diaphragm 106. The capacitors, again, can be referred to as primary and secondary capacitors.

As illustrated in FIG. 5, the various electrodes in sensor 56 are coupled to analog to digital converter 62 over electrical connection 103, 104, 108 and 110. Additionally, the deflectable diaphragm 106 couples to analog to digital converter 62 through connection 109. As discussed in U.S. Pat. No. 6,295,875, the differential pressure applied to the sensor 56 can be measured using the electrodes 144-150.

FIG. 5 also shows acoustic source 14 in acoustic sensor 18 as discussed above. Electrical connection 170 is provided from acoustic sensor 18 to analog to digital signal converter 62. Acoustic source 14 can operate independently or can operate under the control of circuitry within the transmitter. For example, the acoustic source 14 can be controlled by circuitry within the sensor module 52 or electronics board 72 in FIG. 4.

As illustrated in FIG. 5, due to the positioning of source 14 and sensor 18, the acoustic signal 16 (not shown in FIG. 5) will traverse the sensor 56 and travel through the fill fluid carried in the sensor cavity. This fill fluid is pressurized due to the connection to the process fluid through impulse piping 94 and isolation diaphragm 90.

Although FIGS. 4 and 5 illustrate a differential pressure sensor using a deflectable diaphragm, the present invention can be implemented with any type of pressure sensor. As discussed above, the present invention can also be implemented in a stand-alone pressure sensor. Additionally, the acoustic signal can coupled to any point in the system in which a pressurized fluid is provided. For example, the acoustic signal can be coupled to the capillary tubes 94 or cavities 92 illustrated in FIG. 5. In addition to determining line pressure as discussed above, the acoustic signal can also be used to measure high-speed process noise which can be used, for example, in diagnostics. The acoustic signal can be at a single frequency, at a changing frequency or at multiple frequencies to enhance measurement characteristics. In another example configuration, the acoustic signal 16 is generated directly from the noise within the process itself. In such a configuration, element 14 shown above can comprise a second acoustic sensor. In such a configuration, the transit time between sensors 14 and 18 of the noise signal can be used to infer line pressure. In another example, the two sensors are used to measure the dispersion of the process noise between two points. This information can then be used to infer line pressure. In another example configuration, an additional acoustic sensor 200 is provided as illustrated in FIG. 5. Acoustic sensor 200 is inserted at some location between the source and receiver 14 and 18, for example within cavity 92. This additional sensor 200 can be used to detect the process noise delay in the module. For example, the existing pressure sensor is capable of detecting lower frequency process noise. The additional sensor 200 can be used to detect the process noise delay within the module and can be compared to the acoustic signal detected by sensor electrode 144 or 148.

Although the present invention has been described with reference to preferred embodiments, workers skilled in the art will recognize that changes may be made in form and detail without departing from the spirit and scope of the invention.

What is claimed is:

1. A transmitter configured to measure a process variable of an industrial process, comprising:
   a pressure sensor structure containing a pressure sensor therein, the pressure sensor configured to couple to a pressure of a process fluid and provide a pressure output related to process pressure, the pressure sensor coupled to process piping through impulse piping whereby the pressure sensor structure is spaced apart from the process piping which carries the process fluid, wherein the propagation speed of an acoustic signal in the process fluid is a function of pressure of the process fluid;
   an acoustic detector coupled to the pressure sensor structure configured to receive the acoustic signal propagated through the pressure sensor structure and provide an acoustic output related to propagation speed of the acoustic signal; and
   measurement circuitry coupled to the pressure sensor and the acoustic detector configured to generate an output related to pressure of the fluid as a function of the pressure output and propagation speed of the acoustic signal.

2. The transmitter of claim 1 wherein the impulse piping carries an isolation fluid which couples to the process fluid through an isolation diaphragm.

3. The transmitter of claim 1 wherein the pressure sensor comprises a differential pressure sensor.

4. The transmitter of claim 3 wherein the output related to pressure of the fluid comprises flow rate.

5. The transmitter of claim 1 wherein the pressure sensor comprises a line pressure sensor.

6. The transmitter of claim 5 wherein the measurement circuitry is configured to diagnose operation of the line pressure sensor based upon the acoustic signal.

7. The transmitter of claim 1 wherein the measurement circuitry calculates temperature based upon the acoustic signal.

8. The transmitter of claim 1 including a temperature sensor and wherein the output related to pressure of the fluid is further a function of temperature sensed by the temperature sensor.

9. The transmitter of claim 1 wherein the pressure sensor includes a deflectable diaphragm.

10. The transmitter of claim 1 including an acoustic source coupled to the fluid configured to transmit the acoustic signal into the fluid.

11. The transmitter of claim 1 including a process noise sensor configured to detect process noise in the pressure sensor.

12. The transmitter of claim 1 wherein the output related to pressure of the fluid comprises line pressure.

13. A method of measuring a process variable of an industrial process, comprising:
   coupling a pressure sensor structure to a process fluid through impulse piping, the pressure sensor structure carrying a pressure sensor, wherein propagation speed of acoustic signals in the process fluid is a function of pressure of the process fluid;
   measuring a pressure of the process fluid using the pressure sensor coupled to the process fluid and providing an output related to process pressure;
   receiving an acoustic signal which has propagated through the pressure sensor structure which has a propagation speed through the process fluid which is a function of pressure of the process fluid; and
   providing an output related to pressure of the process fluid based upon the propagation speed of the acoustic signal through the process fluid and the process pressure.

14. The method of claim 13 wherein the impulse piping carries an isolation fluid which couples to the process fluid through an isolation diaphragm.

15. The method of claim 13 wherein measuring a pressure comprises measuring a differential pressure sensor.

16. The method of claim 15 wherein the output related to pressure of the fluid comprises flow rate.

17. The method of claim 13 wherein measuring a pressure comprises measuring a line pressure.

18. The method of claim 17 including diagnosing operation of a line pressure sensor based upon the acoustic signal.

19. The method of claim 13 including calculating temperature based upon the acoustic signal.

20. The method of claim 13 including sensing temperature and the output related to pressure of the fluid is further a function of sensed temperature.

21. The method of claim 13 wherein the output related to pressure of the process fluid based upon the acoustic signal comprises the line pressure of the process fluid.

* * * * *